United States Patent [19]
Ullmann et al.

[11] 4,072,842
[45] Feb. 7, 1978

[54] ELECTRO-EROSION MACHINE TOOL AND A PULSE GENERATOR FOR USE IN SUCH A MACHINE TOOL

[75] Inventors: Werner Ullmann, Locarno; Ernst Bühler, Tenero, both of Switzerland

[73] Assignee: A.G. fur industrielle Elektronik, Losone near Locarno, Switzerland

[21] Appl. No.: 694,569

[22] Filed: June 10, 1976

[30] Foreign Application Priority Data

June 17, 1975 Switzerland .......................... 7855/75
Apr. 29, 1976 Switzerland .......................... 5420/76

[51] Int. Cl.² ............................................... B23P 1/08
[52] U.S. Cl. ................................. 219/69 C; 219/69 P; 307/360; 328/147
[58] Field of Search ................ 219/69 C, 69 P, 69 W, 219/69 M, 69 G; 307/360, 351; 328/146, 147, 135

[56] References Cited

U.S. PATENT DOCUMENTS

| 3,655,937 | 4/1972 | Ullmann et al. | 219/69 P |
| 3,683,284 | 8/1972 | Mueller | 307/360 |
| 3,731,045 | 5/1973 | Ullmann et al. | 219/69 W |
| 3,973,104 | 8/1976 | Ullmann et al. | 219/69 P |

*Primary Examiner*—Bruce A. Reynolds
*Attorney, Agent, or Firm*—Flynn & Frishauf

[57] ABSTRACT

A pulse generator for use in forming the erosion pulses of an electro-erosion machine tool comprises means for forming two envelope curve signals representing upper and lower limit levels for the instant level of the output pulse, a comparing device for comparing the actual current level of the output pulse with the envelope curve signals, and a current supply for forming the pulse under the control of a switch which is turned on and off by the comparing means in such a way as to maintain the output pulse current level in the region represented by the space between the envelope curves.

17 Claims, 18 Drawing Figures

ELECTRO-EROSION MACHINE TOOL AND A PULSE GENERATOR FOR USE IN SUCH A MACHINE TOOL

INTRODUCTION

The invention relates to a pulse generator for use in metal machining by electro-erosion, for example spark erosion, and to an electro-erosion machine tool having such a pulse generator.

For metal working by spark erosion, the working pulses would be controlled with respect to their duration, pulse duty factor, repetition frequency and amplitude; additionally, the wave shape of the working pulse is also a factor. The importance of the shape of the working pulses, including the time duration of the positive-going edge and the negative-going edge, has been recognised for some time and various types of generator have therefore been developed.

Control of the shape of working pulses produced by the old relaxation generators (LC/RLC generators) was limited by the component elements and erosion was effected only by working pulses of sinusoidal or similar form. As a result of the introduction of pulse generators making use of power transistors, erosion has been effected in newer machines with rectangular working pulses but here control of the shape of the working pulses was limited. There has been proposed a generator which is, in effect, a combination of these old and new generators. This is described in German disclosure document DT OS No. 2,320,702, to which U.S. Pat. No. 3,832,510 corresponds, and comprises, in addition to the electro-erosion circuit, an inductance for the shaping of the working pulse. However, wave shaping depends upon the time constant of the inductance and so the possibility of variation of the pulse shape for different types of erosion work is limited.

It has also been proposed to connect sequentially a number of transistorised generators in order thereby to be able to form a working pulse composed of the pulses from the plurality of generators. This arrangement of a large number of generators, which is described in U.S. Pat. No. 3,655,937 also affords only a limited possibility of variation for producing a desired shaping for different types of erosion work.

The invention has for its object to design a generator which permits any conceivable shaping of a working pulse for specific erosion processes.

A further object of the invention is to provide a generator which can vary the shape of the working pulse in a very short time, i.e. in a time of the order of magnitude of the duration of a working pulse. This is important with a view to the optimising control systems which have now been developed, e.g. control system such as those described in U.S. Pat. No. 3,859,186 and its divisional Pat. No. 3,973,104, U.S. patent application Ser. No. 401,185 refiled under Ser. No. 527,889, now U.S. Pat. No. 3,975,607 and Swiss application No. 2110/75, to which U.S. Pat. No. 4,045,641 corresponds. The rapid variation of the working pulses which is required by such modern regulating systems cannot be achieved by the known generators. The invention therefore provides an advantageous adaptation of the generator to these modern control systems, so that not only the shape of the working pulse, but also the other parameters such as amplitude, repetition frequency and pulse duty factor of the working pulse, can be varied within the period of the pulses, i.e. the duration of one pulse plus the ensuing space before the start of the next pulse.

SUBJECT MATTER OF THE INVENTION:

A pulse generator forms electrical pulses which are to be passed across a working gap between a workpiece and a tool electrode in an electro-erosion machine tool so as to machine the workpiece by eroding it, the pulse generator comprising:

envelope signal forming means for forming respective signals having waveforms which define an upper and a lower envelope curve having shapes corresponding to the envelope shape of the pulse to be generated;

current supply means for supplying electrical current to said working gap, the supply means including a switch for turning the supply current on and off;

gap current representative signal forming means for forming a signal representative of the gap current passing across said gap;

comparing means which is connected to said envelope signal forming means and said gap current representative signal forming means and is operable for comparing the gap current representative signal with each envelope signal;

control means which is connected to be responsive to the output of the comparator means and to control said switch for turning said supply current on and off in dependence upon the comparison; and diode means connected to said supply means to form a circuit which includes the said work gap when the generator is in use and in which residual current can flow when said supply current is turned off by said switch.

According to another aspect of the invention, there is provided an electro-erosion machine tool in which electrical pulses are passed across a working gap between a workpiece and a tool electrode so as to machine the workpiece by eroding it, the machine tool comprising a pulse generator as described above operably connected to apply said electrical pulses to said gap.

Using the invention, it is possible to make the voltage and the current of the working pulses at the work gap more independent of fluctuations of the supply voltage for the whole generator and the operating voltage at the work gap. In this way, better constancy of the energy is maintained. Owing to this independence of the working pulse, its current does not rise when a short-circuit is present in the work gap. The power dissipation of the power switches which are controllable semiconductors, for example transistors, and which turn on and off the working pulses in the spark erosion circuit, does not rise in the event of a short-circuit. Therefore, the power taken up from the generator is reduced in the event of a short-circuit. This has a favourable effect on the dimensioning of the power switches.

DESCRIPTION OF THE DRAWINGS

For a better understanding of the invention and to show how the same may be carried into effect reference will now be made, by way of example, to the accompanying drawings, in which.

Figure 1:
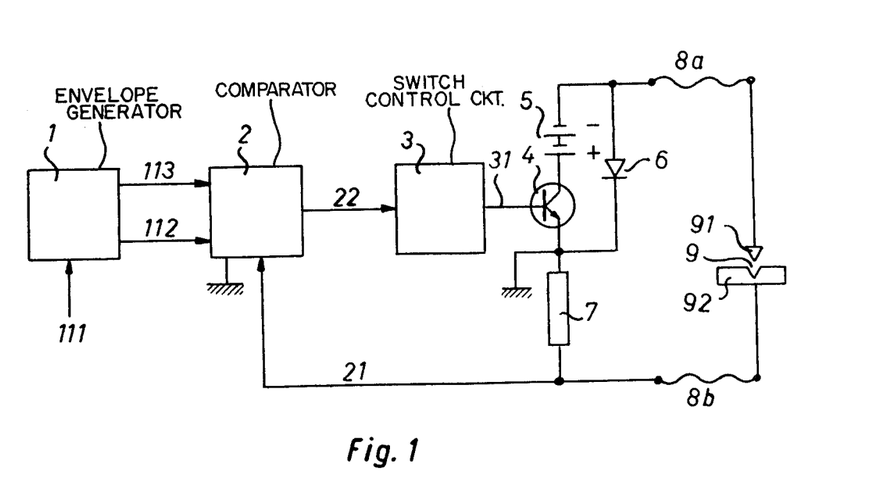
FIG. 1 is a simplified circuit diagram of a pulse generator.
Figure 2A:
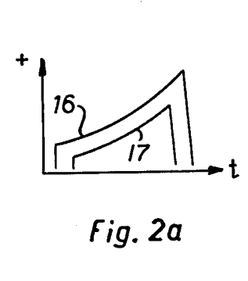
FIG. 2a, 2b, and 2c show exemplary forms of envelope curves.
Figure 2B:
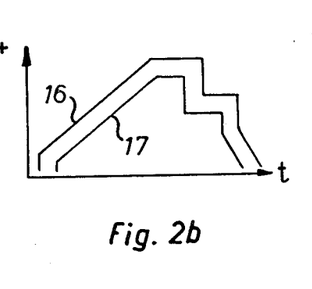
Figure 2C:
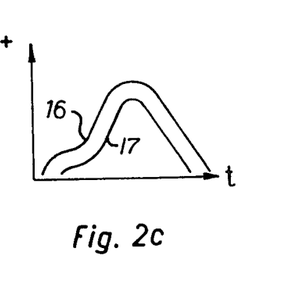

The pulse generator of FIG. 1 comprises a device 1 for forming upper and lower envelope signals having waveforms such as the upper and lower waveforms 16 and 17 respectively in FIGS. 2a, 2b, 2c. The two envelope curves or limiting curves bound a range in which the instantaneous level of the output pulse of the generator may lie and hence determine the amplitude, the repetition frequency, the pulse duty factor and the shapes of the desired working pulse at the work gap 9. The device 1 may consist of one or more signal generators or a computer. By means of a signal generator, a plurality of different predetermined curve shapes, of types which are often used for spark erosion can be formed, and the pair of envelope curves 16, 17 are generated accordingly. Suitable signal generators are described in detail in the handbook "Linear Applications", second edition, Aug. 1973, National, on pages AN 7218 to AN 7224. By means of a computer, all conceivable types of curves can be set and hence all possible pairs of envelope curves can be generated. In the case of a computer, the curves will normally be composed of small and minimum-sized standardised curve parts form each type. In accordance with the same principle, curves may be stored in digital form in one or more stores and called up, or read-out as required. The stores can comprise programmable read-only memories (PROM), diode matrices, core stores, or the like.

In FIGS. 2a, 2b and 2c, three examples of useful curve types are illustrated. The chosen electrical parameters such as amplitude, repetition frequency, duty factor and shape of the working pulse at the work gap 9 formed by the maching electrode 91 and by the workpiece 92 will depend upon decisions associated with the machining to be performed. With these data regarding the desired working pulse, the device 1 can generate the two envelope curves 16 and 17 when the distance between the two envelope curves has been fixed, and hence the region in which the working pulse to be applied to the work gap 9 is to be present. The envelope curve 16 is the upper or maximum level, and the other envelope curve 17 is the lower or minimum level. When the current value of the working pulse at the work gap 9 exceeds the maximum envelope curve 16 or falls below the minimum envelope curve 17, there are carried out in accordance with the invention manipulations at the spark crosion circuit 4, 5, 6, 7, 8a, 8b, 9. These manipulations, which will hereinafter be discussed in detail, ensure that the working pulse remains in the region between these envelope curves 16, 17.

FIG. 2a illustrates a pair of envelope curves 16, 17 with a steep rise, for example from a voltage of 0 volt to one of 2 volts. There then occurs a gentle rise of the voltage in the form of a "sagging rope", for example from 2 volts to 10 volts. Thereafter, a vertical drop occurs. The working pulses at the work gap formed by the machining electrode 91 and the workpiece 92, will have the same shape as the pair of envelope curves. The pulse shape shown in FIG. 2a affords the advantage that, during the passage of the working pulse between the machining electrode 91 and the workpiece 92 in the work gap 9, the current density (i.e. current strength per unit area) remains constant. This is due to the fact that the area of the channel through which the pulse passes increases during its passage, the area increasing according to a curve similar in shape to the "sagging rope" part of the pulse. The end flank of the pulse comprises a sudden drop, almost vertically, from maximum amplitude to zero. Such a pulse form improves the roughness of the eroded surfaces of the workpiece 92.

The form of the pair of envelope curves 16, 17 of FIG. 2b shows a similar positive-going edge to that in FIG. 2a and a negative-going edge which improves the physical conditions in the work gap 9 in the case of special erosion processes.

The pair of envelope curves 16, 17 shown in FIG. 2c exhibits a specific positive-going edge for improving the energy of the discharge of the working pulse in the work gap 9.

The desired shape of the generated pulse and its various parameters such as duration, repetition frequency and so on are set via the input connection 111 at the device 1 either manually by the operator or by a numeric control system such as one of those described, for example, in U.S Pat. Nos. 3,731,043; 3,731,044; and 3,731,045. There may also be connected to the said connection 111 the aforesaid optimising control system of U.S. Pat. No. 3,859,186, U.S. application Ser. No. 401,185 refiled as continuation Ser. No. 527,889, now U.S. Pat. No. 3,975,607 Ullmann et al and Swiss Application 2110/75 to which U.S. Ser. 641,241, now U.S. Pat. No. 4,045,641, Ullmann et al, corresponds. The device 1 generates the envelope curves 16 and 17 accordingly. There appears at the output line 112 of the device 1 the upper level signal as maximum envelope curve 16 and at the output line 113 the lower level signal as minimum envelope curve 17. These two level signals pass to a comparing device or comparator 2 which also receives via line 21 a signal representative of the current in the spark erosion circuit 4, 5, 6, 7, 8a, 8b, 9 this signal being formed by a sensing sensor 7 which here comprises a resistor connected serially in the erosion circuit. The device 2, which is normally a comparator, compares the level signals 16, 17 with the current condition of the spark erosion circuit 4, 5, 6 7, 8a, 8b, 9. It will be assumed that, at the beginning of the erosion process, the current in the spark erosion circuit is zero. In this case, the device 2 generates at its output line 22 an output signal which causes a control circuit 3 to close a power switch 4 by way of the line 31. Only one switch 4 has been shown in FIG. 1, because a single power switch is sufficient in the case described. Of course, a number of such power switches, which are constructed as controllable semiconductors, for example transistors, may be employed, to increase the current lever or so that a multi-channel generator is obtained for supplying a number of machining electrodes 91. The base network of the semiconductor 4 has been omitted from FIG. 1 for the sake of clarity. The closed or "on" semiconductor switch 4 connects the current source 5 to the spark erosion circuit, whereby a current begins to flow in the spark erosion circuit, the rate of change of which is limited by the characteristics (for example inductance and capacitance) of the lines 8a and 8b. The connection lines 8a, 8b between the generator comprising components 1-7 are used to filter the rectangular current pulses produced by the power switch 4 and to shape these pulses to the desired wave shape. In the embodiment illustrated in FIG. 1, the lines 8a and 8b have an inherent inductance in the range from 0.5 μH to 3 μH and an inherent capacitance of 0.2 nF - 10 nF. Of course, other values may be useful for similar embodiments. When the signal representing the level of current lies below the upper level signal 16, the output signal of the device 2 at the line 22 remains unchanged, so that the power switches 4 are maintained in the closed or "on" condition. When the signal on the line 21 rises higher than the upper level signal of the line 112 representing the maximum envelope curve 16, the signal on the lines 22 and 31 disappears and the power switch 4 is opened or, in other words, turned off so that the current source 5 is separated from the spark erosion circuit. When the switch 4 is opened, the inherent inductance of the lines 8a and 8b provides an electro-motive force which tries to maintain the current and the presence of a diode 6 connected across the switch 4 allows this inductive or "residual" current to flow. The residual current has a magnitude which gradually decreases towards zero, and, were it not for the actuation of switch 4, would reach zero after a time dependent on the value of the inductance of lines 8a and 8b. In fact, as soon as the current representative signal on the line 21 falls below the lower level signal of the line 113, which represents the minimum envelope curve 17, the device 2 again applies an output signal to the line 22 which causes the device 3 to apply a turn-on signal via the line 31 to the switch 4. Hence, the source 5 is again connected to the spark erosion circuit. Due to the aforesaid processes, the current flowing in the spark erosion circuit 5, 7, 8a, 8b, 9 remains in the desired region between the values represented by the two envelope curves 16, 17. The comparison by the device 2 takes place continuously, the switch 4 being turned on whenever the erosion circuit current is less than the lower envelope curve level and off when the erosion circuit current becomes greater than the upper envelope curve level. This results in a working pulse at the work gap 9 which on average corresponds exactly in shape to the pair of envelope curves 16, 17 and so the electrical parameters such as amplitude, repetition frequency, pulse duty factor and shape of the working pulses therefore correspond exactly to the parameters preset in the device 1. As already mentioned, not only automatic numeric control systems, but also optimising systems may be connected to the input 111 of the first circuit arrangement 1. More particularly with modern optimising systems, the electrical parameters of the working pulses must be very rapidly varied, e.g. within one pulse period, when a tendency to a degeneration of the physical conditions in the work gap 9 is detected. With the generator shown in FIG. 1 the pairs of envelope curves 16, 17 can be varied during the short period of one work pulse, for example from the form of FIG. 2a to the form of FIG. 2b or 2c, and the next output pulse will automatically change its shape so as to correspond with the new envelope curves.

Figure 3:
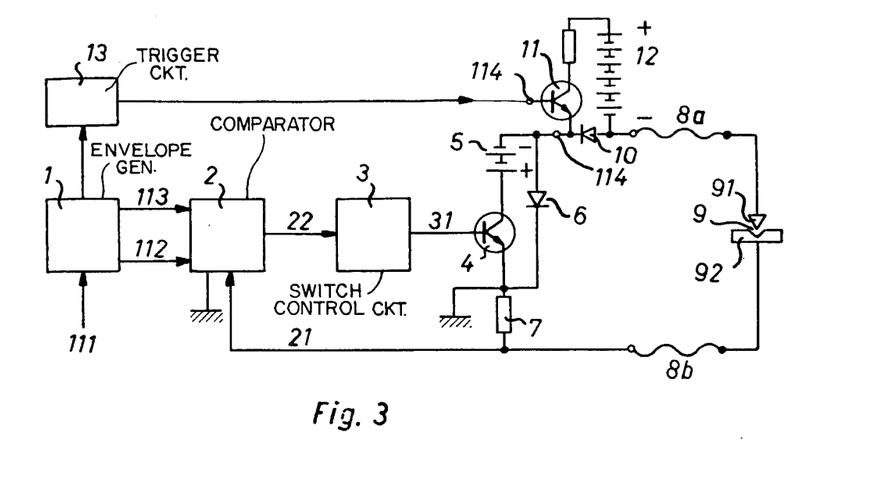
FIGS. 3, 4 and 5 are simplified circuit diagrams of respective further embodiments of the pulse generator.

With the embodiment illustrated in FIG. 3 relatively high voltage firing pulses can be superimposed on the working pulses so as to more easily initiate discharge across the work gap 9. It will be appreciated that the embodiment of FIG. 1, because it can in principle form any desired shape of pulse, could also provide pulses with such a high voltage discharge initiating peaks or impulses formed therein. Even so, the embodiment of FIG. 3 is useful, for example when, for one reason or another, the source 5 does not provide a sufficiently high voltage to easily initiate discharge, for example when erosion is to be effected with a much wider than usual work gap. The firing pulses are generally superimposed upon the initial or front portions of each working pulse. The firing pulses are provided by a voltage source 12 and a transistor switch 11 (of which the base network has been omitted from FIG. 3 for clarity) connected to the erosion circuit at terminal connecting member 114 thereof along with a shunt diode 10 which ensures that the actual working pulse can flow in the circuit when the transistor switch 11 is turned off. As before, a diode 6 is provided and thus, along with the diode 10, allows the residual or inductive current to flow when both the transistor switches 4 and 11 are off. The switch 11 is controlled by a trigger device 13 which detects a predetermined positive level of the upper envelope signal 16 and then turns on the power switch 11 for a predetermined time, or for the whole duration of a positive upper level signal 16. The device 13, in a first case, is a level detector triggered monostable multi-vibrator, and in a second case, a simple level detector. The switch 11 is thus turned on in synchronism with the generation of the envelope curves and the firing pulses are superimposed on the desired portions of the respective working pulses. Otherwise than the above, the embodiment of FIG. 3 is identical, in construction and operation, to the embodiment of FIG. 1.

Figure 4:
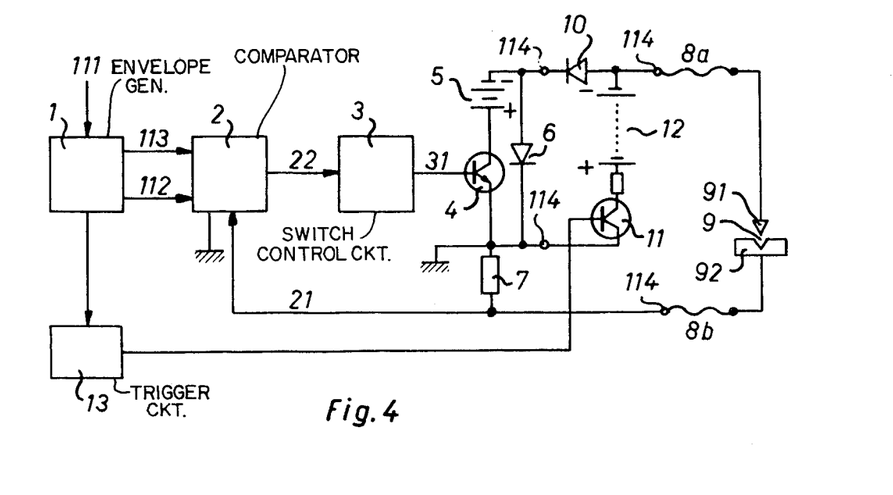

The embodiment of FIG. 4 has the same function as the FIG. 3 embodiment but here the voltage source 12 and the transistor switch 11, operable to form the firing pulses, are connected in parallel into the spark erosion circuit 5, 6, 7, 8a, 8b, 9 at the terminals 114. The diode 10 remains in the same position as that shown in FIG. 3 but here it has the function of isolating the working pulse generating components, i.e. the source 5, switch 4 and such, from the relatively high voltage firing pulses.

Figure 5:
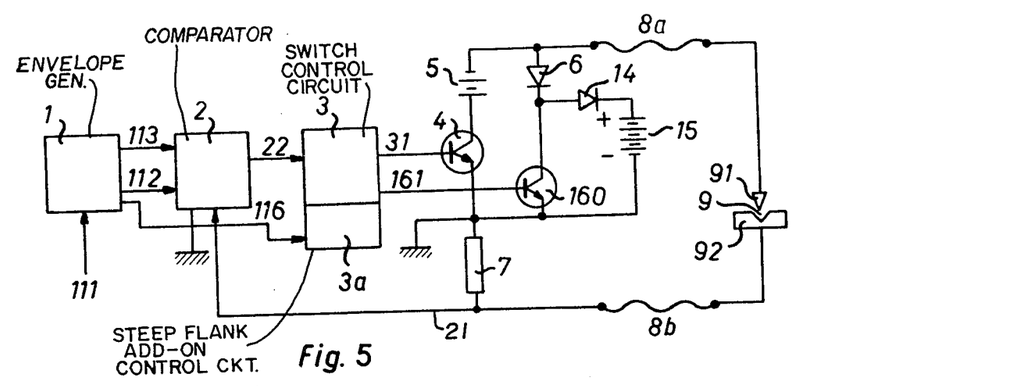

As mentioned before, the inductance of the lines 8a and 8b tends to maintain the gap current after the switch 4 is turned off, i.e. effectively to make the current drop off more gradual after such turn off of switch 4. However, it may be required to form a pulse having a steep, even virtually vertical, negative going edge, for example as exhibited by the pulses of FIGS. 2a and 2b, where the steepness or rate of change of current is greater than is normally permitted by the inductance of the lines 8a and 8b of the spark erosion circuit. To allow such rapid changes in current, the pulse generator may be adapted as shown in FIG. 5. An energy store, shown as an additional battery 15 is provided, and is provided a switching element 160, which may be a transistor and which may be brought into synchronism with the condition of the power switch 4 through the line 161 from the control device 3 under the control of an additional circuit part 3a of the device 3 which additional part is in turn controlled over a line 116 leading thereto from the envelope signal generating device 1. Part 3a termed a steep flank add-on control circuit, since it provides additional control effects if the envelopes of the signals have steep flanks. When a steep edge to the working pulse is required, as determined by signal generator 1, an appropriate control signal is passed by the device 1 over line 116 to the control device part 3a which then responds and controls device 3 so that the control device proper i.e. the part 3 controls the switches 4 and 160 (base networks omitted for clarity) in synchronism i.e. so that at the appropriate times each switch is turned off. The comparator circuit 2 detects on the line 21 a signal which is higher than the upper level signal 16, (because of the steep edge of the signal 16) and so turns off immediately the switching element 4. Under this condition the current of the erosive circuit 7, 8b, 9, 8a can only pass by the diodes 6 and 14 to the battery 15. In this way the energy stored in the erosive circuit will be recuperated in a very short time. As a result the desired steep edge is formed. When the switch 160 is turned off, the energy stored in the lines 8a, 8b is rapidly transferred into the energy store 15 by way of a diode 14, the diode 14 and store 15 being connected in series across the switch 160. As a result, the desired steep edge is formed. The store 15 may comprise, as shown, a voltage source connected so that it has the opposite polarity to that of the source 5. The manner of operation of the rest of the FIG. 5 embodiment is the same as that of the embodiment of FIG. 1.

Figure 6:
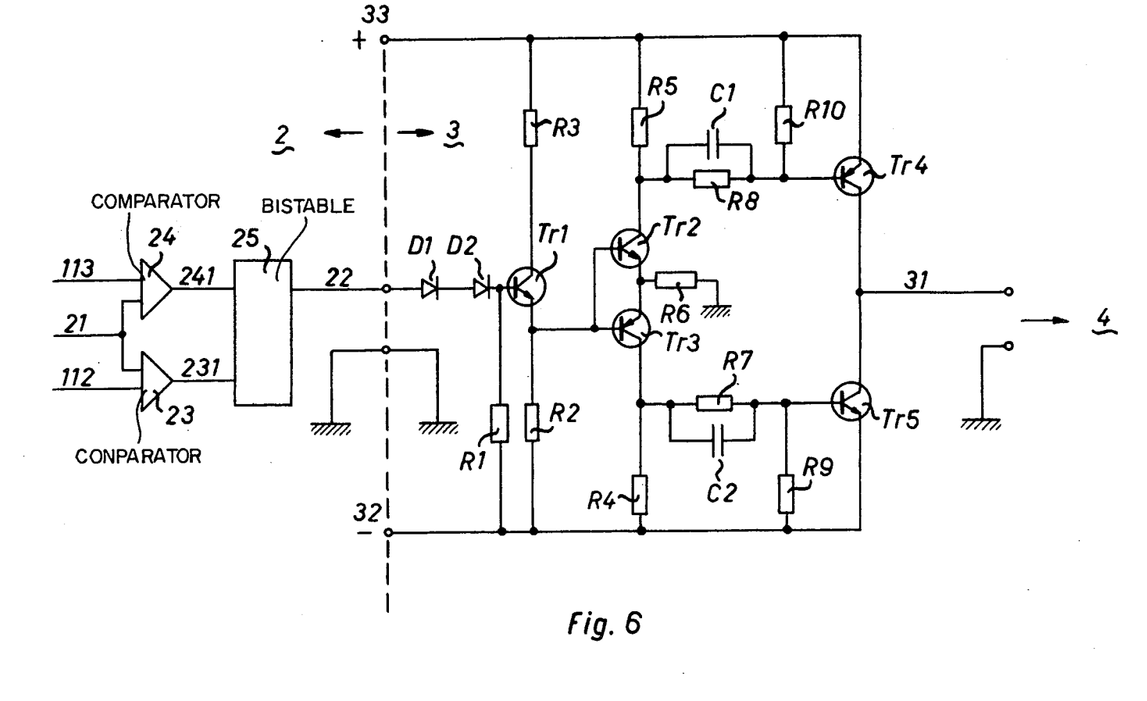
FIG. 6 is a circuit diagram of a comparing device and control means used in the pulse generators of FIGS. 1 and 3 to 5.

As shown in FIG. 6, the comparing device 2 comprises two comparators 23 and 24 which receive from the device 1 (not shown) via the lines 112 and 113 respectively the upper and lower envelope curve signals 16 and 17 respectively. The gap current representative signal from the detector 7 (not shown) passes through the line 21 also to the two comparators where it is compared with the respective envelope signals. When the gap current signal falls to the level of the minimum envelope curve signal 17 on the line 113, the comparator 24 applies a signal through its output line 241 to a succeeding bistable trigger stage 25, whereby the latter is brought into one of its states. This results in a signal at the output line 22, which passes through two series connected diodes $D_1$, $D_2$ to a transistor $Tr_1$ in the control circuit 3. This transistor amplifies the signal and brings it to a suitable voltage level in order thereby to control the succeeding transistors $Tr_2$, $Tr_3$, which are connected to form a complementary current source. The said complementary current source $Tr_2$, $Tr_3$ renders possible a wide variation of the supply voltage applied to the terminals 32, 33 without affecting the operation of the circuit. This range of variation of the supply voltage is obtained because a current impressed by the resistor $R_6$ is applied to the base network of the resistors $R_5$, $R_8$, $R_{10}$ and of the capacitor $C_1$ of the transistor $Tr_4$ and the current impressed by $R_6$ is also applied to the base network of the resistors $R_4$, $R_7$, $R_9$ and of the capacitor $C_2$ of the transistor $Tr_5$. Due to this particular arrangement, the base signals applied to the transistors $Tr_4$ and $Tr_5$ are substantially independent of the supply voltage at the terminals 32, 33. The illustrated complementary emitter connection of the two transistors $Tr_4$, $Tr_5$ is preferred because it facilitates the design of the circuit with a view to minimising losses in these transistors at high current. The illustrated construction of the control circuit 3 as a whole facilitates the design of the circuit with a view to enabling high current output signals to be supplied to the output line 31 with high switching speed and good efficiency. The signal which has been applied to the transistor $Tr_1$ along the line 22 is amplified and applied to the line 31 leading to the power switches 4 (see FIG. 1), which is brought into the conducting condition by this signal and hence connects the source 5 into the spark erosion circuit. In this way, the magnitude of the gap current and hence of the signal on line 21 is raised, so that the level does not fall below the instant level of the minimum envelope curve 17. The comparator 24 does not apply any further signal to its output line 241. The bistable trigger stage 25, however, remains in its set condition, so that the power switch 4 also remains in the conducting condition. This condition is maintained as long as the condition signal along the line 21 remains in the desired range between the two envelope curves 16, 17 (lines 112, 113). When the current signal on line 21 rises to the level of the maximum envelope curve 16 of the line 112, the comparator 23 applies a signal, from its output line 231, to the bistable trigger stage 25, which is returned into its other condition. In this way, the signal at the line 22 is turned off. The transistors $Tr_1$, $Tr_2$, $Tr_3$, $Tr_4$, $Tr_5$ are brought into their non-conducting condition, so that the signal at the line 31 is turned off. The power switch 4 then disconnects the source 5 from the spark erosion circuit. It is here to be noted that the connection and disconnection of the source 5 by the power switch 4 in the spark erosion circuit is carried out a number of times during the period of a working pulse. The circuit arrangement of FIG. 6 is designed for very high switching speed. In addition, the signals along the line 31 are applied with relatively high currents to the power switch 4, so that satisfactory operation of these switches is ensured.

Figure 7:
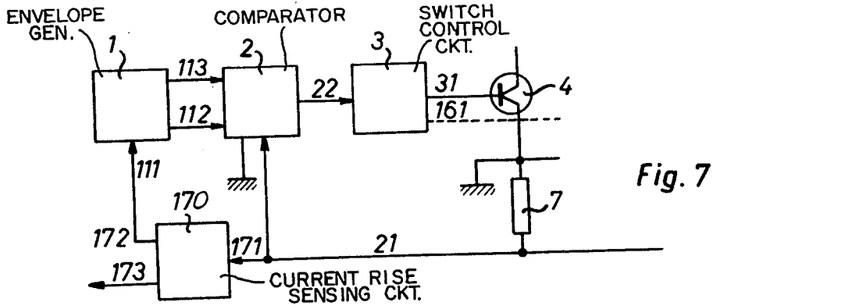
FIG. 7 is a simplified circuit diagram of a part of a pulse generator and means for regulating the pulse shape.

In FIG. 7, there is provided a regulating unit 170, with the aid of which the rate of rise of the current can be measured during the period when the power switch 4 is in the "on" condition, i.e. while the current source 5 of the spark erosion circuit is connected into the circuit and employed, instead of the optimising systems already mentioned with reference to FIGS. 1, 3, 4 and 5, to regulate and control the working pulses. It is connected at its input 171 to the line 21, at which the signal representative of the current in the spark erosion circuit is present. One output 172 of the unit 170 is connected to the control input 111 of the device 1 instead of the optimising systems. A second output 173 of the unit 170 is intended for servo-control of the machining feed advance and return drive of the machine tool. As will hereinafter be more fully explained with reference to FIG. 8, the unit 170 senses and measures, from the signal on the lines 21, 171, the speed of the current rise in the spark erosion circuit, i.e. the speed of the current rise of each working pulse, and hence determines whether, due to conditions in the work gap 9, e.g. a tendency to short-circuiting, a degeneration of the working pulse is starting to develop or is perhaps already present. When such a degeneration is detected the unit 170 applies via its output 172 to the input 111 of the device 1 a signal for varying the envelope level signals, and hence the electrical parameters of the working pulse in a manner which counteracts the tendency to short-circuiting. The other output 173 of the unit 170 supplies along the line 173 an analog means value signal for the servo arrangement (not shown), which normally causes relative movement of the machining electrode 91 and the workpiece 92 towards each other so as to progressively machine the workpiece while maintaining the optimum work gap 9, or which causes the workpiece and tool electrode to move apart when a degeneration of the working pulses in the work gap is detected. The regulating unit 170 may be provided in the embodiments of FIGS. 1, 3, 4 and 5 in the same way as in that of FIG. 7.

Figure 8:
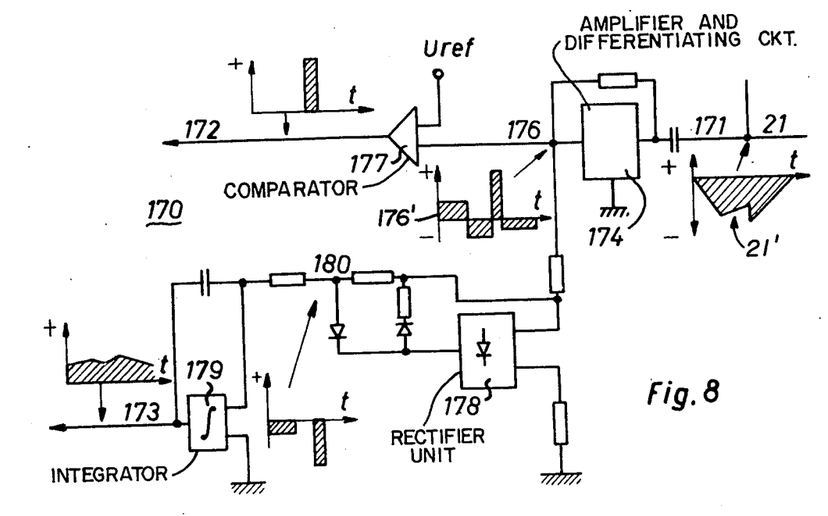
FIG. 8 is a simplified circuit diagram showing in more detail the regulating means of FIG. 7.

Referring now to FIG. 8, it will be assumed that there is present on the line 21 a current signal 21' whose variation with time during a particular working pulse is drawn below this line. Owing to the use and arrangement of the resistor 7 to form the signal, its polarity is inverted in relation to that of the actual working pulse, i.e. its shape is the same as that of the working pulse but it is upside down and is negative in polarity. As shown the magnitude of the signal, and hence also the working pulse, comprises an initial gradual increase in value then a small drop and thereafter a very steep current rise, which might indicate a tendency to short-circuiting in the work gap 9. Thereafter, the level falls gradually back to zero. The gap current signal passes to an amplifier 174 which also comprises a differentiating element and in which the condition signal is amplified and differentiated. There is thus obtained at point 176 a signal 176', as drawn close to this point, comprising corresponding to the initial current rise of the input current signal a positive, rectangular pulse and then, corresponding to the current drop of the input current signal, a negative, rectangular pulse. The extremely steep current rise of the input current signal results, in the signal at point 176, in a rectangular pulse of large positive amplitude. Finally, there corresponds to the gradually sloped end flank of the input signal a further rectangular, negative pulse in the signal at point 176. This signal passes to one input of a comparator 177 where it is compared with a reference voltage Uref. This reference voltage is so set that, for example, only high level pulses corresponding to steep current rises which may indicate a short-circuiting tendency in the work gap 9 are passed on to the output 172 of the comparator 177. The reference voltage is set when the generator is first put into operation, taking into consideration the true conditions in the spark erosion circuit. The output signal of the line 172, which now comprises only a positive, rectangular pulse of large amplitude indicating a tendency to short-circuiting in the work gap 9, passes along the line 111 into the device 1, where its effect is that, for example, the upper level signal which is represented by the envelope curve 16 at the line 112 is somewhat reduced, and the range between these two curves 16 and 17 — of course temporarily — made somewhat narrower, so that the ripple of the current condition on the spark erosion circuit is decreased. It is here to be noted that the signal along the output line 172 of the unit 170 is digital and is employed for the adaptive regulation in the device 1. The digital signal of the output line 172 is dependent upon the operating voltge Vfs of the spark gap, i.e. upon the width of the work gap 9. This will be more particularly explained in the following.

The differentiated gap current signal appearing at point 176 is additionally fed to one input of a rectifier arrangement or unit 178, the other input of which is connected to ground so that only the positive parts of the signal are passed, these parts also being inverted so that they appear at point 180 as two spaced apart negative pulses, the second of which is the large amplitude short circuit tendency indicating pulse. This rectified and inverted signal is fed to an integrator 179. In the integrator 179, the signal is integrated and passes as an analog mean-value signal along the output line 173 to the servo arrangement (not shown) for the feed mechanism of the machine tool. The analog mean-value signal, whose form is drawn close to the output line 173, serves to control the servo-system, i.e. for the feed advance or the retraction of the machining electrode 91 in relation to the work piece 92. The true current rise in the spark erosion circuit of FIGS. 1, 3, 4, 5 and 7 is measured by the unit 170 in the following manner:

$$di/dt = E/L = Vsp - Vfs/L$$

where:
Vsp = supply voltage = constant
L = line inductance = constant
Vfs = operating voltage of the spark gap
from which there follows:

$$\text{current rise } di/dt = f(Vfs)$$

The unit 170 thus renders possible a rapid adaptation of the electrical parameters for the working pulses and a very rapid reaction of the servo system to unstable discharges in the work gap 9.

Figure 9:
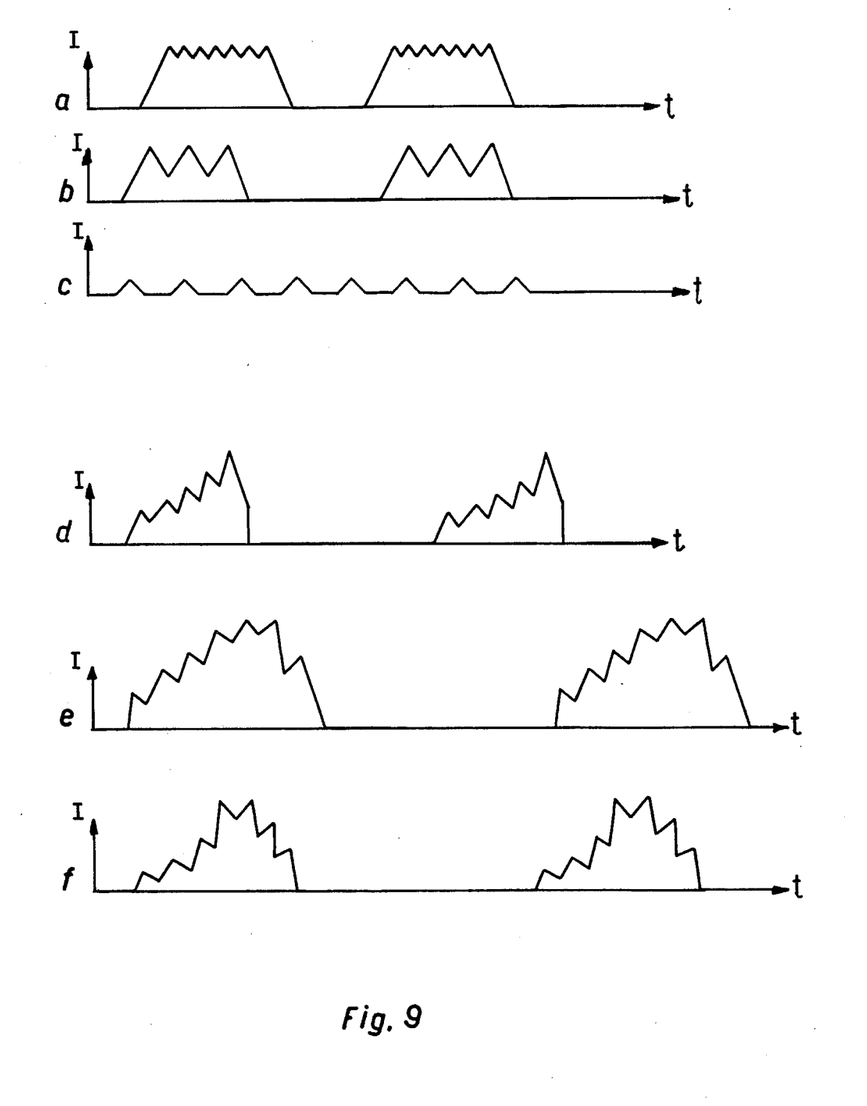
FIGS. 9a, 9b, 9c, 9d, 9e and 9f illustrates shapes of working pulses for particular types of erosion processes.

A number of working pulses are illustrated in FIG. 9. These working pulses are formed by correspondingly pre-set envelope curve pairs 16, 17. In FIG. 9a, there are shown two pulses whose peaks are provided with small triangular pulses. Such working pulses are employed for a good removal of the eroded material from the surface of the workpiece 92 during the liquid phase of the material. The working pulses of FIG. 9a are employed for rough working by erosion, in which as much material as possible must be removed from the workpiece 92 within a short time.

FIG. 9b shows working pulses having a triangular ripple. These pulses are also used for rough erosive working.

FIG. 9c shows small triangular pulses having large pulse spacing. These pulses are used for fine erosive working, in which the rate of removal of material plays no great part, but the surface quality and accuracy to size are the essential criteria.

FIG. 9d, 9e and 9f show special forms of working pulses which are employed in particular types of erosive processing. These are pulse shapes as obtained by the envelope curve pairs 16, 17 of FIGS. 2a, 2b and 2c.

Figure 10:
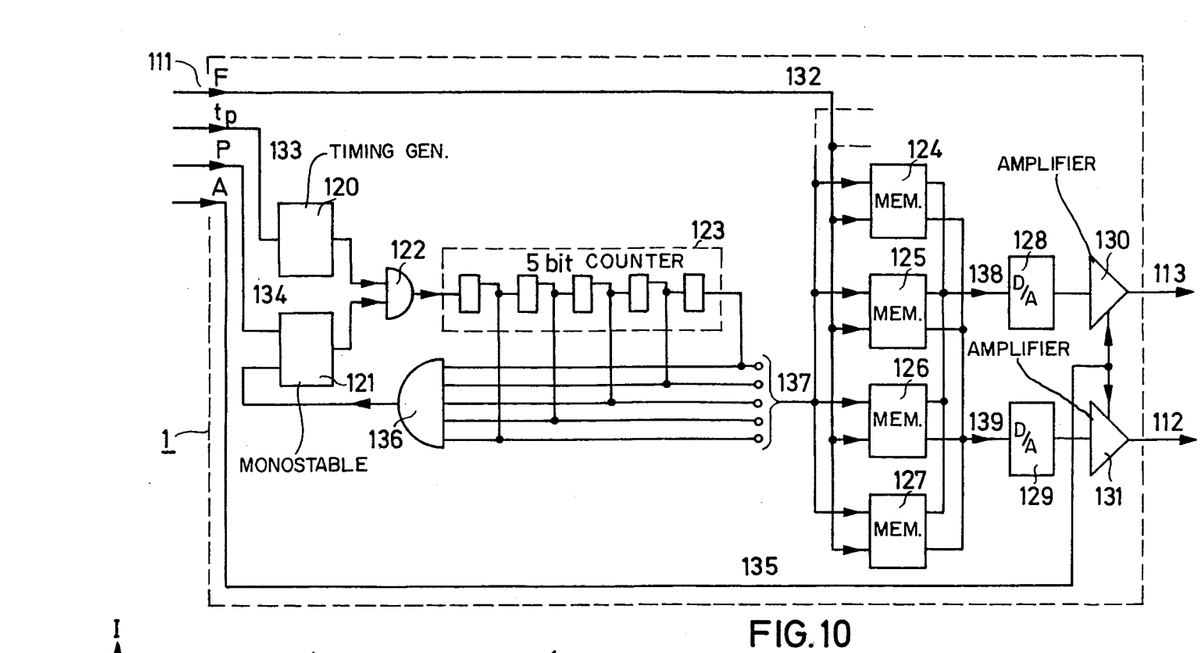
FIG. 10 is a simplified circuit diagram of one embodiment of a signal generator which may be used in the pulse generators of FIGS. 1 and 3 to 7.
Figure 11:
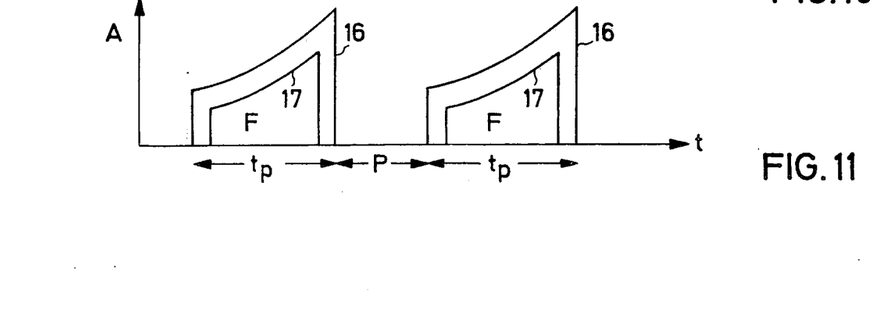
FIG. 11 is a graphical illustration of envelope curves useful in explaining the operation of FIG. 10.

FIG. 10 shows one example of the construction of the envelope signal forming device 1. It consists of a timing pulse generator 120, a monostable multivibrator 121, a gate 122, an address counter 123, four programmable read-only memories (PROM) 124, 125, 126 and 127, two digital-to-analog convertors 128 and 129, and two amplifiers 130 and 131. In each of the read-only stores are stored an upper and a lower envelope signal 16 and 17 having a respective one of a plurality of different waveforms which have proved desirable for particular erosion operations. The two envelope signals in each store are each stored in the form of a series of digital values representing the magnitudes of samples of the waveform taken in succession along the abscissa. Thus, when the digital values are serially read out from the store in their proper sequence, the particular waveform is reconstructed. There could be a number other than four of the read only stores, for example there could be substantially more than four as indicated by the chain lines. Referring also to FIG. 11 showing an example of the shape of the envelope signal which can be formed, the input lines 111 are connected to means (not shown) for supplying signals for controlling the shape F, time duration $t_p$, the time duration of the interpulse interval P, and the current strength or magnitude A of the erosion pulses to be applied to the work-gap of the erosion machine. The means for supplying these signals may comprise one of the regulating systems and optimising systems which are disclosed in the afore mentioned prior patent specifications, the read-out device of a data storage system, for example a punched card or magnetic tape storage system, or a manual control device comprising manually operated input elements such as, for example, keys, selecting switches or potentiometers. The signals F, which selects the shape of the erosion pulse is fed through the line 132 to the read-only stores and causes that one of the stores which contains signals of the desired waveform to become operable. It will be assumed that the desired shape is that of the pair of envelope curves 16 and 17 in FIG. 11 and that the read-only memory 124 contains these curves and has hence been selected through the line 132. The pulse duration control $t_p$ passes from the control line 111 through the line 133 into the timing pulse generator 120 which applies timing pulses to one input of the gate 122. The gate 122 passes these signals provided no signal is applied to its other input by the monostable multivibrator 121 and blocks them when the multivibrator does apply such a signal. The timing pulses pass from the gate 122 to the address counter 123, which has been drawn as a five-bit counter in the example illustrated in FIG. 10. The address counter 123 cyclically counts the addresses 0–31. The counter 123 has five stages or "bits" so it can count from 0 to a maximum of 31. On receipt of each pulse from the gate 122, the content of the counter increases by one until the content is 31 and then the next pulse causes its content to become zero again. The five "bit" output signals of the counter pass through the lines 137 to the selected read-only store 124. Here, each of the envelope curves 16 and 17 is stored in the form of a sequence of 32 digital signals representing the magnitudes of samples of the curve taken successively along the time axis $t$ thereof. By way of example, each digital signal may take any one of 16 different binary values, i.e. the amplitude axis I of the waveform may be divided into 16 increments — for this, each storage location, containing one digital signal, has to comprise four "bits". For each value of the content of the address counter 123 a different pair of storage locations of the memory 124 is read-out. Thus, as the counter 123 counts the pulses received from the gate 122, the digital signals representing the magnitudes of the samples of the two envelope curves 16 and 17 are read out in sequence, at a speed dependent on the repetition rate of the pulses so as to reconstruct the envelope curves. Each of the last pair of storage locations (for example, those having the address 31) in the memory 124 always contains the digital signal 0000. This indicates the end of the respective envelope curve, and is the amplitude, i.e. zero, which the outputs of the device 1 are to have throughout the duration P between each successive pair of pulses. This condition is detected by the end detector 136 which applies an end signal to the monostable multivibrator 121. On receipt of the end signal, the monostable multivibrator produces a pulse of duration P, the multivibrator having been set to produce a pulse of this duration by the signal P through the appropriate one of the input lines 111. This pulse passes to the gate 122 which thereby closes so that, for the time P, no more pulses from the timing pulse generator 120 can pass to the address counter 123. When the monostable multivibrator 121 falls back into its stable condition, the gate 122 becomes open again, so that the pulses can pass from the generator 120 to the address counter 123. The storage locations of the read-only memory 124 are thus again interrogated in sequence from the beginning (address O) whereby the envelope curves 16 and 17 are reconstructed once again. The read-only memory 124 is so organised that the maximum envelope curve 16 passes through one output line 139 to the succeeding digital-to-analog convertor 129. The minimum envelope curve 17 passes through another output line 138 to the other digital-to-analog convertor 128. The two convertors 128 and 129 convert the digital curve values into analog values, so that the maximum envelope curve 16 passes in the analog form illustrated in FIG. 11 to the succeeding amplifier 131 and the minimum envelope curve 17 passes in the form also illustrated in FIG. 11 to the other succeeding amplifier 130. In the two amplifiers 130 and 131, the desired amplitude or current strength of the two envelope curves 16 and 17 is set in accordance with the signal A emitted by the control line 111 through the line 135. The maximum envelope curve 16, passes through the line 112, and the minimum envelope curve 17 passes through the line 113, to the succeeding comparing device 2 as shown in FIGS. 1 and 3 to 7.

In the embodiment shown in FIG. 10, each of the read-only stores 124, 125, 126 and 127 contains an upper and a lower curve 16 and 17 respectively having a particular shape. As alternatives (not shown) one read-only store may be assigned to each curve, i.e. so that there are two stores for each pulse shape to be formed, one for the upper and one for the lower envelope curve relating to that shape, or there may be a single store in which the upper and lower envelope curves for more than one pulse shape are stored. Which of the different arrangements is chosen depends on the construction and capacity of the stores to be used.

The number of control lines 111 shown in FIG. 10, and the parameters controlled by the signals fed through those lines, are given by way of example only.

Similarly, various modifications may be made to the specific embodiments hereinbefore described, the scope of the invention being defined solely by the following claims.

We claim:

1. A pulse generator for forming electrical pulses which are to be passed across a working gap between a workpiece and a tool electrode in an electro-erosion machine tool so as to machine the workpiece by eroding it, the pulse generator comprising:

envelope signal forming means (1) for forming respective signals having waveforms which define an upper and lower envelope curve (16 and 17) having shapes corresponding to the envelope shape of the pulse to be generated;

current supply means for supplying electrical current to said working gap, the supply means including a switch (4) for turning the supply current on and off;

gap current representative signal forming means (7) for forming a signal representative of the gap current passing across said gap;

comparing means (2) which is connected to said envelope signal forming means (1) and said gap current representative signal forming means (7) and is operable for comparing the gap current representative signal with each envelope signal;

control means (3) which is connected to be responsive to the output of the comparator means and to control said switch for turning said supply current on and off in dependence upon the comparison; and diode means (6) connected to said supply means to form a circuit (via 6, 7, 8a and 8b) which includes the said work gap when the generator is in use and in which residual current can flow when said supply current is turned off by said switch (4).

2. A pulse generator according to claim 1, wherein said envelope signal forming means (1) comprises at least one signal generator and includes a control input for receiving a control signal which regulates and controls the envelope signals.

3. A pulse generator according to claim 2, wherein said signal generator comprises a digital signal storage system.

4. A pulse generator according to claim 3, wherein said signal generator comprises:
   digital signal storage means (124 through 127) for storing respective sequences of digital signals representative of said envelope curves;
   address counting means (123) connected to said storage means and operable for interrogating the storage locations of the storage means in proper sequence so that the digital signals representative of a particular envelope curve are read out to reconstruct a signal having a waveform which corresponds to that envelope curve, controllable amplifier means (130, 131) connected to the storage means for receiving and amplifying the said reconstructed envelope curve signals; and control signal input means (111, 135, 120, 121) connected to said address counting means and said amplifier means and operable for receiving control signals and, in dependence thereon controlling the operation of the signal generator, including the amplification factor of said controllable amplifier means, to vary parameters of the said reconstructed envelope curve signals.

5. A pulse generator according to claim 4, wherein said control signal input means includes a timing pulse generator (120) having an input for receiving a control signal which determines the pulse durations of said envelope curves, a monostable multivibrator having an input for receiving a control signal which determines the interpulse interval of said envelope curves, the timing pulse generator being connected to said address counter by way of gating means (122) which is connected to be controlled by the monostable multivibrator in such manner that pulses are passed from the timing pulse generator to the address counter for the duration of each pulse of the said envelope curves and are blocked during the interval between such pulses by the gating means.

6. A pulse generator according to claim 5, wherein said digital signal storage means comprises at least one programmable read-only memory (PROM) and wherein the signal generator includes at least one digital-to-analog convertor (128, 129) connected to the memory and operable for converting into analog signals the digital signals read-out from the memory.

7. A pulse generator according to claim 4, wherein said storage means is operable for storing the signals of the upper and lower envelope curves relating to more than one shape of pulse waveform, and wherein the signal generator includes means (132) for enabling a particular set of storage locations of the storage means to be selected, so that only these locations are interrogated by said address counting means, by means of a received waveform shape control signal whereby, under the control of said signal, signals corresponding to a desired one of the available shapes of pulse waveform are generated.

8. A pulse generator according to claim 1, wherein said comparator means (2) comprises two comparators (23, 24), one of which is connected to receive said current signal and the upper envelope signal and the other of which is connected to receive said current signal and the lower envelope signal and a trigger component (25) connected to the two comparators to be controlled thereby.

9. A pulse generator according to claim 1, wherein said control means (3) comprises:
   a first transistor amplifier stage ($Tr_1$) connected to receive and amplify the output from said comparator means (2);
   a second transistor amplifier stage ($Tr_2$ to $Tr_5$) comprising a complementary current source ($Tr_2$, $Tr_3$) connected to receive the output from said first stage ($Tr_1$) and operable for forming two complementary current signals dependent upon the said output from said first stage, two complementary output transistors ($Tr_4$, $Tr_5$), resistor means (R7 to R10) connected between said complementary current source and said output transistors for forming from said complementary current signals respective input signals for the output transistors, which input signals are substantially independent of the voltage level of the power supply for the transistor stage, the said output transistors being connected together so that their output signals are combined to form a control signal for said switch (4).

10. A pulse generator according to claim 9, including capacitor means (C1, C2) connected to said resistor means for increasing the speed of switching of said transistors.

11. A pulse generator according to claim 1, wherein said gap current representative signal forming means (7) comprises a detector element connected to said supply means so as to be in the circuit which includes the supply means and the said working gap when the pulse generator is in use.

12. A pulse generator according to claim 1, further including firing voltage supply means, semiconductor switch means (11) connected to the firing voltage supply means for forming firing pulses, and synchronising means (13) connected to control the semiconductor switch means (11) and for synchronising the operation thereof with the operation of said switch (4), said semiconductor switch means and further diode means (10) being connected to said current supply means to cause said firing pulses to be superimposed on respective pulse generator output pulses (FIGS. 3 and 4).

13. A pulse generator according to claim 1, further including an energy storage element (15), a diode (14) connected between said storage element and said circuit (6, 7, 8a, 8b), and semiconductor switch means (160) which is connected to said storage element and said circuit and which has a control input connected to said control means (3, 3a), the control means being operable for controlling the semiconductor switch means to enable current to pass via said diode between said storage element and said circuit and hence to increase the rate of change of current in said circuit (FIG. 5).

14. A pulse generator according to claim 1, further including regulating means (170) connected to a control input (111) of said envelope signal forming means (1) and to said gap current representative signal forming means (7) and operable for determining, from said gap current representative signal, the rate of increase of the gap current and for forming in dependence thereon output signals for controlling said envelope signals.

15. A pulse generator according to claim 14, wherein said regulating means comprises:

amplifying and differentiating means (174) connected to said gap current representative signal forming means (7) and operable for amplifying and differentiating the gap current representative signal to form a signal representative of the actual rate of increase of the gap current; and comparison means (177) having an input connected to said amplifying and differentiating means and another input for receiving a reference signal (Uref) representative of a desired maximum of the said rate of gap current increase, the comparison means being operable for comparing the actual rate of increase signal and the reference signal and for forming said control output signals in dependence upon the comparison.

16. A pulse generator according to claim 15, wherein said regulating means further includes:

rectifier means (178) connected to said amplifying and differentiating means (174) for rectifying said actual rate of increase signals; and integrating means (179) connected to said rectifying means (178) and operable for integrating the rectified actual rate of increase signal to form a control signal for controlling a machining feed drive device of said electro-erosion machine tool.

17. An electro-erosion machine tool in which electrical pulses are passed across a working gap between a workpiece and a tool electrode so as to machine the workpiece by eroding it, the machine tool comprising a pulse generator according to claim 1 operably connected to apply said electrical pulses to said gap.

* * * * *